Patented Apr. 21, 1953

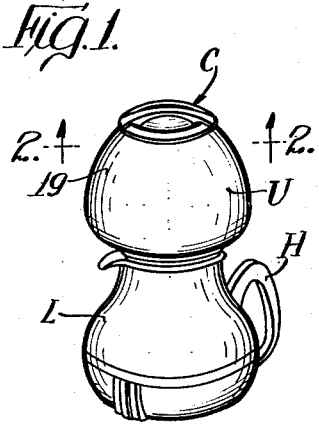

2,635,783

UNITED STATES PATENT OFFICE 2,635,783

TOP CLOSURE FOR VESSELS

Samuel H. Frankel, Chicago, Ill., assignor to Cory Corporation, Chicago, Ill., a corporation of Delaware Application December 21, 1950, Serial No. 202,020

3 Claims. (Cl. 220—40)

My invention relates to a closure for open-top vessels such, for example, as the upper bowl of a coffee maker. Special conditions exist which render difficult the establishment of any lock for the closure when applied to the open top of a coffee brewer. One of these is the appearance which must not be marred; in fact, in the higher-priced coffee makers a great deal of attention is paid to the appearance and ornamental character of these appliances. Any means by which a closure is locked to the upper bowl, resulting in a defacement or deformation of its symmetrical contour, would be wholly unacceptable.

It is not enough that the closure be permitted merely to rest in place upon the open top of the upper bowl of the coffee maker. For the purposes of this invention there should be a positive lock by which the closure may be secured to the coffee maker and serve, if need be, as a lifting means for its upper bowl. By the improvements of this invention I provide such a lock which is effective, entirely concealed, and which may be readily disestablished whenever the occasion requires.

The present top closure comprises three parts which, when assembled, are secured immovably together, to function as a single unit. The exposed parts of the closure are but two in number and both may be made of a suitable plastic material which is contoured and finished with a view to eye appeal. A remaining third part of the closure is a metallic bottom plate, normally concealed, to provide the locking means whereby the closure may be secured to the open top vessel so as to serve as a lifter therefor. The parts so constructed and assembled may be fashioned in accordance with a wide variety of designs, and be produced economically.

It is with objects and purposes such as those just noted, as well as others which will presently appear, that the present invention is primarily concerned. A suggestive embodiment of my invention is set forth in the accompanying drawing wherein:

Figure 1 is a perspective view of a coffee maker to the upper bowl of which is secured a closure having the improved features hereinafter to be described in detail;

Figure 2 is a horizontal section taken on line 2—2 of Figure 1, showing the applied closure in bottom plan view;

Figure 3 is a fragmentary detail in section, taken in the plane of line 2—2 of Figure 1, and showing the locking means in its operative position;

Figure 4 is a fragmentary perspective view of one end of the handle and of the seat provided therefor in the closure lid;

Figure 5 is a vertical section through the closure, taken on line 5—5 of Figure 2;

Figure 6 is a fragmentary sectional view, taken on the arcuate line 6—6 of Figure 3, showing in elevation a portion of the closure together with one end of the handle therefor;

Figure 7 is a similar view, taken on the arcuate line 7—7 of Figure 2; and

Figure 8 is a fragmentary detail in section, taken on line 8—8 of Figure 2.

The coffee maker shown in Figure 1 is typical of an appliance with which the present closure may advantageously be used. It comprises a lower bowl L equipped with a lifting handle H and an upper bowl U having an open top. The upper bowl is supported upon the lower bowl and, with the aid of a suitable bushing of rubber or the like (not shown), is in sealing connection therewith. The two bowls may be produced from any material appropriate for the purpose, one of the suitable metals being suggested in this connection.

The closure C herein shown comprises three interconnected parts, viz., a lid 10 in the general form of a disc, an arched or upwardly bowed handle 11 therefor extending diametrically over the top thereof, and a circular locking plate 12.

The closure disc is shown as downwardly dished on its top face, and is provided with an oblique marginal flange 15 from which depends a circular wall 16. Such a closure may conveniently be produced from plastic material. The exterior face of the circular wall is inset to define a thin circular flange 17 which depends therefrom adjacent an overhanging shoulder s. This flange is adapted for reception within the top opening o of the upper bowl U which is defined by a relatively flat ledge 18 extending inwardly at the top of a wall 19. The shoulder s then rests against the top face of the ledge 18, as best shown in Figure 7. The flange 17 constitutes a centering means for the closure so as to assure its substantial concentricity with the bowl.

The bowl opening o is nearly, but not quite, circular. The diameter of this opening may increase gradually through a distance of 90° and then decrease again so that, although not truly circular, it is nevertheless entirely symmetrical; or the areas of increased diameter which are positioned diametrically opposite each other may extend for only a limited extent, say 60°. It is this latter contour that is illustrated herein, these arcuate recesses which enlarge the diameter of the opening o in one direction being designated as r. Unless closely examined, the out-of-round characteristics of the bowl top opening are not apparent. The increase in diameter due to the arcuate recesses r need not be more than ⅛" to coact with the closure C in providing an effective lock therefor. The term "arcuate recess," as herein used, refers to a cut-back of crescent contour in the edge of the opening o, whether in the form illustrated or otherwise, as for example, at the end of an opening of elliptical contour.

The depending marginal wall 16 of the closure disc provides a partial closure for the shallow space therewithin. In the circular flange 17 is provided two wide gaps g at diametrically opposite points, and at the base of each gap inwardly thereof, is a step 21. This step is positioned opposite a seat 22 in the top face of the closure disc (see Fig. 4) defined by bordering walls 23 which are radially disposed and an inner wall 24 which is tangentially disposed to a circle that is common to both seats. In each of the two steps 21 is a hole 25 for a purpose that will presently appear.

The upwardly bowed handle 11 is diverged radially toward opposite ends where base portions are provided, each of a size and contour to conform with one of the seats 22 for close fitting therein. The handle is desirably formed of a plastic material, and in each of its base portions is formed a boss 26 wherein is anchored a bushing 27 at a point that is coaxial with one of the holes 25.

The circular locking plate 12 is of the proper size to fit closely within the circular flange 17 that depends from the closure disc 10. Extending concentrically within the closure disc is a depending annular rib 28 separated from the adjacent marginal wall by a space x, this annular rib merging with the steps 21 adjacent their outer peripheries (see Fig. 2). This rib provides a continuous circular supporting base for the locking plate 12 which is crimped upwardly at 29 to provide adjacent the disc periphery a circumferentially extending bead that is positioned to lie within the space x to the outside of the circular rib 28. The webs 30 which extend between the steps 21 and the disc wall 16 are arcuately grooved in continuation of the circular space x which otherwise would be twice interrupted.

The locking plate 12 is also provided at diametrically opposite points with radially extending tongues 32 each extending arcuately for substantially the full width of one gap g so as to lie therewithin. In addition, each tongue is formed at its outer periphery with a depending flange 33 from which is extended outwardly an arcuate ear 34 having the special contour best illustrated in Figs. 3, 6 and 7. At one end each ear is inclined downwardly at a to provide a flaring opening, it then continues through a section b for perhaps half the length of the flange in substantial parallelism with the under face f of the ledge 18 of the closure disc, and for the remaining section c of its length, it is gently inclined upwardly. This ear, particularly its inclined end c, constitutes, in effect, a friction lock for engagement with the under face of the ledge 18 adjacent the peripheral opening o. The parallel section b of the arcuate ear is disposed just clear of the under face f of the ledge 18 while the closure is in process of being rotatively advanced to the locking position of Figure 7; in this final position, however, the inclined section c of the ear is pressed tightly against the ledge to frictionally lock therewith and hold the closure firmly against return movement.

The shoulder s adjacent the wall 16 is engaged with the top face of the ledge 18 continuously except for two elongated recesses 36 in its periphery. These recesses are located, by preference, intermediately of the gaps g in the flange 17. They provide arcuate spaces above the ledge communicating with the arcuate recesses r which are disposed radially inwardly thereof (see Fig. 8) whereby to afford vents for movement of air which is driven out of the upper bowl U or is drawn back thereinto, according to the prevailing stage of the coffee-making cycle.

The present top closure is advantageous in the several respects that it lends itself to economical production and wide diversification in design and appearance. The locking plate 12 of metal, which is desirably non-corrosive, is normally concealed from view. The exposed parts of the closure, viz., the lid 12 and handle 11, when made of a suitable plastic material, may be attractively finished and embody lines and contours which are pleasing to the eye. When the handle and locking plate have been united with the lid, all three parts are secured against relative movement and the resulting structure is even stronger than when made of a single piece of plastic as has been tried in the past. Furthermore, the cam ears 34 are endowed with some degree of resiliency so that they may yield to engage the ledge 18 with pressure, thereby to prevent any loose movement of the closure on the upper bowl. This is desirable both to eliminate noise and to frictionally lock the closure in place. It is obvious that application of the closure to the upper bowl involves initially a rotative positioning of the closure such that the arcuate ears 34 are disposed within the recesses r, then a rotation of the closure through 45° or so for shifting the locking ears into operative pressure engagement with the under face of the ledge 18. When so positioned, the closure shoulder s and locking ears 34 are in pressure engagement with opposite faces of the ledge 18, thereby to frictionally hold the closure lid against reverse rotational movement except in response to a manually applied force of substantial magnitude.

I claim:

1. A bowl-closure combination comprising a bowl having its walls at the top inwardly extended horizontally to provide a relatively flat ledge defining a generally circular opening having a plurality of co-radial peripheral recesses, and a closure for the bowl opening comprising a lid provided with a depending marginal wall having a generally circular exterior face inset to form a downwardly facing overhanging shoulder, the depending wall being sized to fit within the bowl opening whereby the overhanging shoulder may rest upon the surrounding ledge, a plate on the under face of the closure lid, a handle on the upper side of the lid, a screw device extending through the plate and lid and threadedly engaging the handle to hold the lid, plate and handle in assembled relationship, said plate being provided, at points corresponding to the peripheral recesses of the bowl, with a plurality of resilient ears each projecting outwardly from the bowl opening axis a distance slightly less than the distance from said axis to the point of maximum depth of the peripheral recesses so as to have capacity for free axial movement past the ledge when the ears are in rotative register with the recesses, a portion of each ear being spaced from the overhanging shoulder a distance slightly less than the thickness of the bowl ledge and presenting an upper surface to said ledge for engagement with the under face thereof whereby, upon rotation of the closure, the several ears may occupy a position in pressure engagement with the ledge to frictionally lock the closure thereto and against axial separation therefrom.

2. A bowl-closure combination comprising a bowl having its walls at the top inwardly extended horizontally to provide a relatively flat ledge defining a generally circular opening having oppositely disposed coradial peripheral recesses, and a closure for the bowl opening comprising a lid provided with a marginal wall having a circular flange depending therefrom and inset to form therewith a downwardly facing overhanging shoulder, the depending flange being sized to fit within the bowl opening whereby the overhanging shoulder may rest upon the surrounding ledge, the circular flange being interrupted to provide two opposite wide gaps, a circular plate having a diameter substantially equal to the inside diameter of the flange on the under face of the closure lid, an arcuate handle on the upper side of the lid having its end in contact therewith, a pair of screw devices extending through the plate and lid and threadedly engaging said ends of the handle to hold the lid, plate and handle in assembled relationship, said plate being provided with a pair of resilient ears each projecting through one flange gap and outwardly from the bowl opening axis a distance slightly less than the distance from said axis to the point of maximum depth of the peripheral recesses so as to have capacity for free axial movement past the ledge when the ears are in rotative register with the recesses, a portion of each ear being spaced from the overhanging shoulder a distance approximately the same as the thickness of the bowl ledge and presenting an upper surface to said ledge for engagement with the under face thereof whereby, upon rotation of the closure, a portion of each of the several ears may occupy a position in pressure engagement with the ledge to frictionally lock the closure thereto and against axial separation therefrom.

3. A bowl-closure combination comprising a bowl having its wall at the top inwardly extended horizontally to provide a relatively flat ledge defining a general circular opening with a plurality of co-radial peripheral recesses, and a closure for the bowl opening having a substantially circular centering flange depending thereinto for engagement with the periphery of the circular opening and provided with an overhanging downwardly facing marginal portion to rest upon the surrounding ledge thereof, a substantially circular plate extending across the underside of the closure and having a diameter substantially equal to the inside diameter of the flange, said plate being formed with co-radial resilient ears spaced to lie oppositely of the peripheral recesses of the bowl opening, the ears being extended radially outwardly a distance greater than the radius of the bowl opening but less than that of the peripheral recesses therein whereby to position the ears for free axial movement therethrough, the ears being engageable with the underside of the ledge when the plate is rotatively advanced to position the ears out of register with the peripheral recesses, a bowed handle extended crosswise of the closure upon its top and provided at each of its opposite ends with a base, there being a pair of seats in the top face of the closure each accommodating one handle base and engaging therewith to secure the handle against movement relative to the closure in any direction except axially away therefrom, and screw fastening means traversing the plate and each closure seat and in engagement with the two bases of the handle for locking both the plate and handle to the closure in unitary relation therewith.

SAMUEL H. FRANKEL.

References Cited in the file of this patent

UNITED STATES PATENTS

| Number | Name | Date |
|---|---|---|
| 2,105,201 | Richheimer | Jan. 11, 1938 |
| 2,258,145 | Woodman | Oct. 7, 1941 |

FOREIGN PATENTS

| Number | Country | Date |
|---|---|---|
| 291,941 | Great Britain | June 14, 1928 |